(12) United States Patent
Kim et al.

(10) Patent No.: US 12,592,428 B2
(45) Date of Patent: Mar. 31, 2026

(54) BATTERY MODULE AND DEVICE INCLUDING THE SAME

(71) Applicant: SK On Co., Ltd., Seoul (KR)

(72) Inventors: Ji Hyung Kim, Daejeon (KR); Young Ha Kim, Daejeon (KR); Sang Bin Lee, Daejeon (KR); Ho Jin Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 576 days.

(21) Appl. No.: 18/108,658

(22) Filed: Feb. 13, 2023

(65) Prior Publication Data

US 2023/0387495 A1 Nov. 30, 2023

(30) Foreign Application Priority Data

Mar. 31, 2022 (KR) ......................... 10-2022-0040789

(51) Int. Cl.
H01M 10/653 (2014.01)
H01M 10/613 (2014.01)
(Continued)

(52) U.S. Cl.
CPC ....... H01M 10/653 (2015.04); H01M 10/613 (2015.04); H01M 10/647 (2015.04);
(Continued)

(58) Field of Classification Search
CPC ............. H01M 10/653; H01M 10/613; H01M 10/647; H01M 10/6551; H01M 10/6554;
(Continued)

(56) References Cited

U.S. PATENT DOCUMENTS

| | | | |
|---|---|---|---|
| 2016/0301117 A1 | 10/2016 | Tyler et al. | |
| 2021/0257690 A1* | 8/2021 | Kilhenny | ............ H01M 10/617 |
| 2021/0260850 A1 | 8/2021 | Jin et al. | |

FOREIGN PATENT DOCUMENTS

| | | |
|---|---|---|
| EP | 3934007 A1 | 1/2022 |
| KR | 10-1543477 B1 | 8/2015 |

(Continued)

OTHER PUBLICATIONS

Partial European Search Report on the European Patent Application No. 23156231.5 issued by the European Patent Office on Aug. 8, 2023.

(Continued)

*Primary Examiner* — Eugenia Wang
(74) *Attorney, Agent, or Firm* — IP & T GROUP LLP

(57) ABSTRACT

A battery module in accordance with the present disclosure includes a secondary battery including an electrode assembly and an exterior material configured to accommodate the electrode assembly, a housing member configured to accommodate the secondary battery, and a temperature control member formed inside the housing member, wherein the battery module comprises a structure in which a metal layer formed on an outermost surface of the exterior material comes in contact with the temperature control member, such that temperature deviation among a plurality of the secondary batteries in the battery module is reduced and thus an efficiency in temperature control is enhanced.

12 Claims, 4 Drawing Sheets

(51) Int. Cl.

| | |
|---|---|
| *H01M 10/647* | (2014.01) |
| *H01M 10/6551* | (2014.01) |
| *H01M 10/6554* | (2014.01) |
| *H01M 50/105* | (2021.01) |
| *H01M 50/119* | (2021.01) |
| *H01M 50/121* | (2021.01) |
| *H01M 50/124* | (2021.01) |
| *H01M 50/126* | (2021.01) |
| *H01M 50/129* | (2021.01) |
| *H01M 50/211* | (2021.01) |
| *H01M 50/249* | (2021.01) |

(52) U.S. Cl.
   CPC ... *H01M 10/6551* (2015.04); *H01M 10/6554*
   (2015.04); *H01M 50/105* (2021.01); *H01M*
   *50/119* (2021.01); *H01M 50/121* (2021.01);
   *H01M 50/1243* (2021.01); *H01M 50/1245*
   (2021.01); *H01M 50/126* (2021.01); *H01M*
   *50/129* (2021.01); *H01M 50/211* (2021.01);
   *H01M 50/249* (2021.01)

(58) Field of Classification Search
   CPC ............. H01M 50/105; H01M 50/119; H01M
           50/121; H01M 50/1243; H01M 50/1245;
           H01M 50/126; H01M 50/129; H01M
                   50/211; H01M 50/249
   See application file for complete search history.

(56)                  References Cited

FOREIGN PATENT DOCUMENTS

| | | |
|---|---|---|
| KR | 20160123246 A | 10/2016 |
| KR | 10-2352295 B1 | 1/2022 |
| WO | 2021168026 A1 | 8/2021 |

OTHER PUBLICATIONS

Extended European Search Report on the European Patent Application No. 23156231.5 issued by the European Patent Office on Nov. 16, 2023.

* cited by examiner

BATTERY MODULE AND DEVICE INCLUDING THE SAME

CROSS-REFERENCE TO RELATED APPLICATION

The present application claims priority under 35 U.S.C. § 119(a) to Korean patent application number 10-2022-0040789 filed on Mar. 31, 2022, in the Korean Intellectual Property Office, the entire disclosure of which is incorporated by reference herein.

BACKGROUND

1. Technical Field

The present disclosure relates to a battery module and a device including the same.

2. Related Art

Technology development and demand for mobile devices and electric vehicles are rising. In particular, with the development of the electric vehicle market, there is a demand for the manufacture of batteries that enables long-distance travelling on a single charge. In order to increase the driving range of electric vehicles, the energy density of the battery must be high. Lithium secondary batteries exhibit high energy density and are most suitably used as batteries for electric vehicles.

The lithium secondary battery includes an electrode assembly consisting of a positive electrode, a negative electrode, and a separator as components and an exterior material configured to protect the same. In addition, a battery module in which the plurality of lithium secondary batteries are accommodated is used as a device for the electric vehicles.

In the electrode assembly, heat is generated while undergoing the process of charging and discharging. However, deviation in the temperature in the battery module may take place due to heat generation, causing a problem such as ignition of any one of lithium batteries or explosion by external shock.

Research is required to enhance the stability of lithium secondary batteries by reducing deviation in the temperature in the battery module.

SUMMARY

Embodiments provide a battery module which reduces deviation in the temperature in the battery module to enhance the stability and service life of a secondary battery, and a device including the same.

In accordance with an aspect of the present disclosure, there is provided a battery module including a secondary battery including an electrode assembly and an exterior material configured to accommodate the electrode assembly, a housing member configured to accommodate the secondary battery, and a temperature control member formed inside the housing member and configured to release heat generated in the secondary battery to the outside, wherein the battery module comprises a structure in which a metal layer formed on an outermost surface of the exterior material comes in contact with the temperature control member.

In accordance with an embodiment, the temperature control member may be formed between a bottom surface of the secondary battery and an inner surface of the housing member based on a height direction of the battery module.

In accordance with an embodiment, the temperature control member may include one or more selected from the group consisting of a melanin-based resin, an acrylic resin, an epoxy-based resin, an olefin-based resin, an EVA-based resin, a urethane-based resin, and a silicone-based resin.

In accordance with an embodiment, the metal layer may include aluminum.

In accordance with an embodiment, a thermal conductivity of the metal layer may be greater than or equal to 150 W/(m·K).

In accordance with an embodiment, the exterior material may include a first area including the metal layer and a second area including an outer surface layer configured to cover the metal layer.

In accordance with an embodiment, a nylon-based resin and a polyethylene terephthalate-based resin may be laminated in the outer surface layer.

In accordance with an embodiment, the first area may be an area in which the bottom surface of the electrode assembly and the exterior material come in contact based on a height direction of the electrode assembly.

In accordance with an embodiment, the exterior material may include a heat fusion layer, the heat fusion layer and the metal layer may be laminated in the first area, and the heat fusion layer, the metal layer, and the outer surface layer may be laminated in the second area.

In accordance with an embodiment, a thickness of the heat fusion layer in the first area may be greater than that of the heat fusion layer in the second area.

In accordance with an embodiment, a thickness of the heat fusion layer in the first area may be 1.25 times greater than that of the heat fusion layer in the second area.

In accordance with an embodiment, a thickness of the heat fusion layer in the first area may be 100 μm to 500 μm.

In accordance with an embodiment, the heat fusion layer may include one or more selected from the group consisting of a polyethylene-based resin, a polypropylene-based resin, a polycarbonate-based resin, a polyethylene terephthalate-based resin, a polyvinyl chloride-based resin, an acrylic resin, a polyacrylonitrile-based resin, a polyimide-based resin, a polyamide-based resin, and a cellulose-based resin.

A device in accordance with another aspect of the present disclosure includes the battery module of the present disclosure as a power source.

A battery module in accordance with the present disclosure includes a structure in which an outer surface layer exhibiting low thermal conductivity is removed from an exterior material configured to accommodate an electrode assembly while a metal layer exhibiting high thermal conductivity comes in contact with a temperature control member, such that the temperature deviation among a plurality of the secondary batteries in the battery module is reduced and an efficiency in temperature control is enhanced.

In addition, the battery module in accordance with the present disclosure includes the exterior material of which the thickness of a heat fusion layer is selectively increased only in an area that accommodates the electrode assembly, and thus the insulation performance between a secondary battery and a housing member does not deteriorate.

Accordingly, the battery module in accordance with the present disclosure has the effect of enhancing service life while securing the stability of secondary batteries.

BRIEF DESCRIPTION OF THE DRAWINGS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the example embodiments to those skilled in the art.

Figure 1:
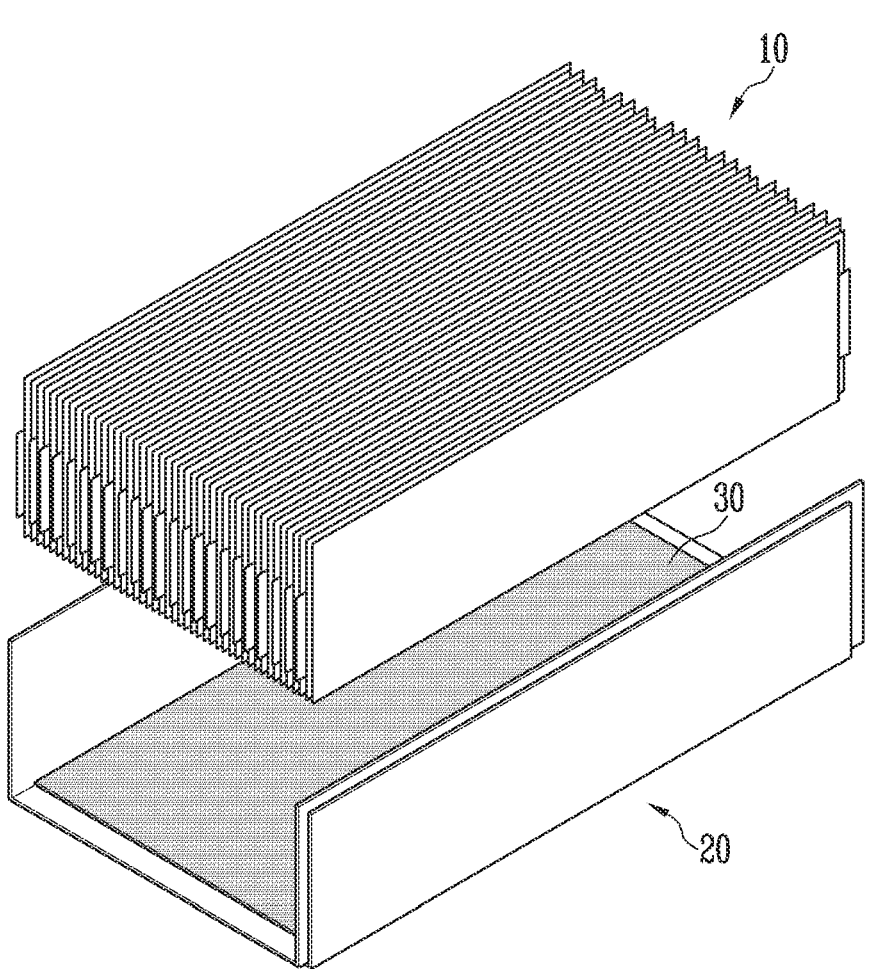

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a perspective view schematically illustrating a battery module in accordance with an embodiment of the present disclosure.

Figure 2:
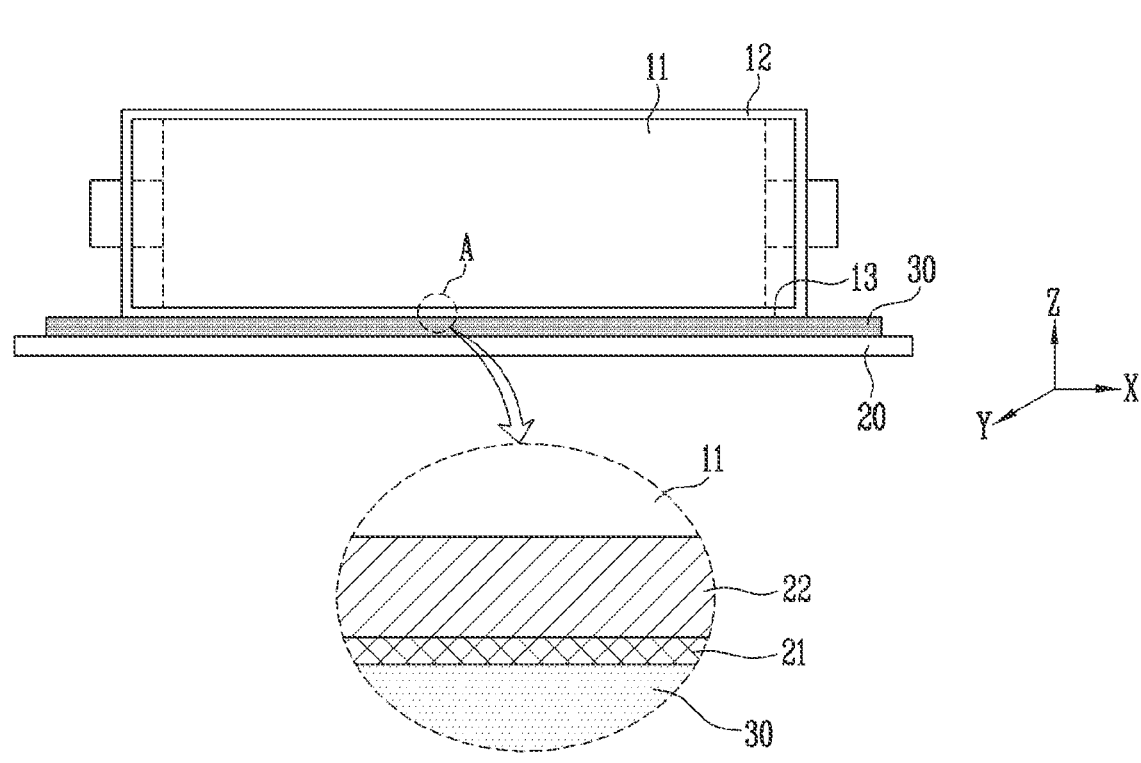

FIG. 2 is a side view schematically illustrating a battery module in accordance with an embodiment of the present disclosure.

Figure 3:
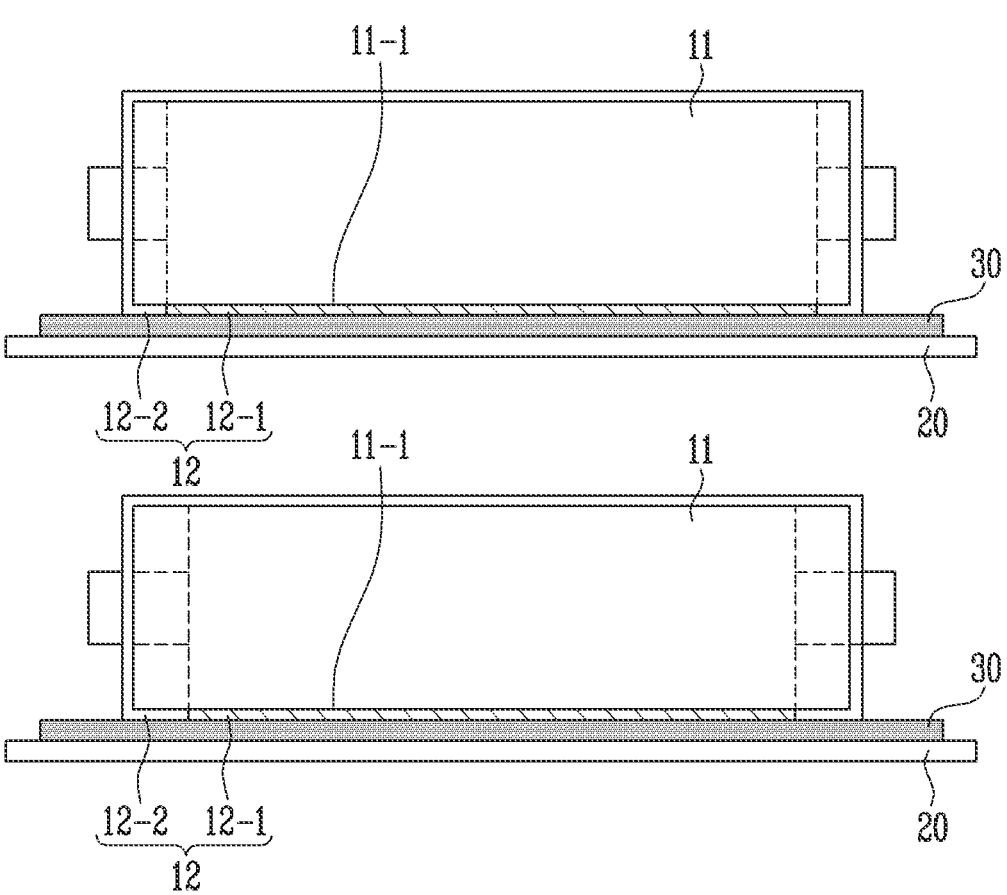

FIG. 3 shows a diagram schematically illustrating a first area and a second area of an exterior material in accordance with an embodiment of the present disclosure.

Figure 4:
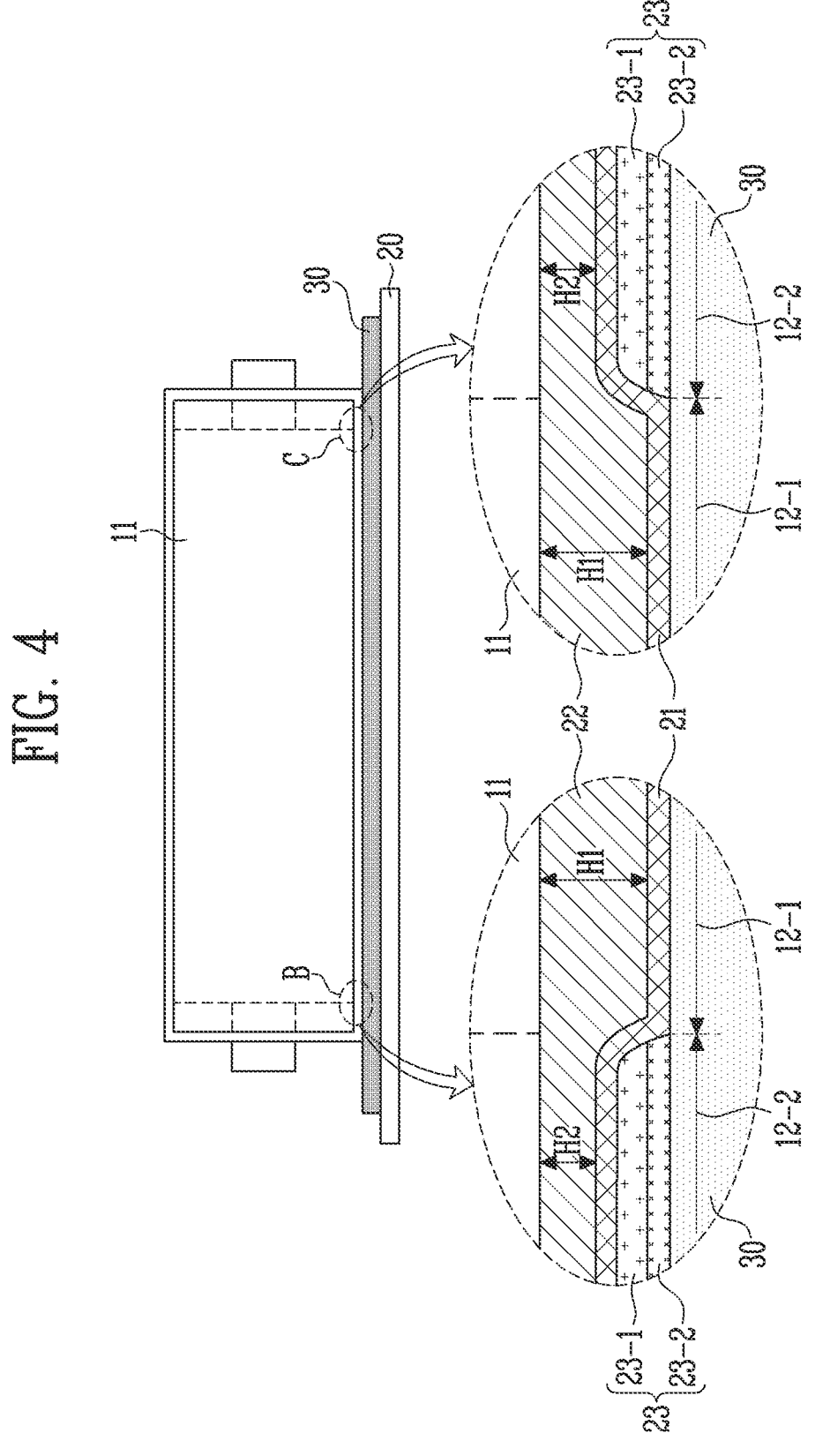

FIG. 4 is a diagram illustrating enlarged boundaries of a first area and a second area of an exterior material in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, a battery module and a device including the same in accordance with the present disclosure will be described.

FIG. 1 schematically illustrates a perspective view of the battery module in accordance with an embodiment of the present disclosure, and FIG. 2 schematically illustrates a side view of the battery module in accordance with an embodiment of the present disclosure.

Referring to FIGS. 1 and 2, the battery module in accordance with an embodiment of the present disclosure includes a secondary battery 10 including an electrode assembly 11 and an exterior material 12 configured to accommodate the electrode assembly 11, a housing member 20 configured to accommodate the secondary battery 10, and a temperature control member 30 formed inside the housing member 20 and configured to release heat generated in the secondary battery 10 to the outside, and also includes a structure in which a metal layer 21 formed on an outermost surface of the exterior material 12 comes in contact with the temperature control member 30.

The electrode assembly 11 may include a positive electrode, a negative electrode, and a separator. A plurality of the electrode assemblies 11 may be provided and sequentially laminated in the exterior material 12. For example, the plurality of electrode assemblies 11 may be provided to be wound, laminated, folded, or stacked in zigzags.

The electrode assembly 11 may be accommodated in the exterior material 12 and provided with an electrolyte to be manufactured as the secondary battery 10. The electrolyte may be a non-aqueous electrolyte. The electrolyte may include a lithium salt and an organic solvent. For example, the organic solvent may include one or more selected from the group consisting of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gammabutyrolactone, propylene sulfide, and tetrahydrofuran.

The housing member 20 may serve as a body of the battery module configured to accommodate the secondary battery 10. In accordance with an embodiment, the housing member 20 may be configured to accommodate the plurality of secondary batteries 10 to protect the plurality of secondary batteries 10 from an external environment, transmit electrical energy generated by the plurality of secondary batteries 10 to the outside, or transmit electrical energy generated from the outside to the plurality of secondary batteries 10.

The housing member 20 may include a bottom portion configured to support the plurality of secondary batteries 10 and a side portion and an upper end portion configured to protect the plurality of secondary batteries 10 from an external environment.

The housing member 20 may include an additional configuration such as a cooling member configured to transmit heat generated in the plurality of secondary batteries 10 to an external heat sink and a busbar configured to electrically connect the plurality of secondary batteries 10 with the outside.

The temperature control member 30 is formed inside the housing member 20 and configured to release heat generated in the secondary battery 10 to the outside. The temperature control member 30 may be formed between the bottom surface 13 of the secondary battery and the inner surface of the housing member based on a height direction Z of the battery module.

In general, in the battery module in which the plurality of secondary batteries are laminated, due to heat generated in the charging and discharging process of the plurality of secondary batteries, the temperature deviation may take place among the plurality of secondary batteries in the battery module, such that the temperature control member is formed inside the housing member so as to control such temperature deviation.

However, since the temperature control member is formed on the bottom portion of the housing member, the temperature deviation takes place among the plurality of secondary batteries based on a height direction of the housing member. In addition, though the temperature control member is in contact with the exterior material configured to accommodate the electrode assembly, on the outer surface layer formed at the outermost surface of the exterior material, the efficiency in the temperature control in the battery module deteriorates due to low thermal conductivity, depending on the contact form between the outer surface layer and the temperature control member.

The battery module in accordance with the present disclosure includes the temperature control member 30 which is formed inside the housing member 20 and configured to release heat generated in the secondary battery 10 to the outside, and also includes a structure in which the metal layer 21 formed on an outermost surface of the exterior material 12 comes in contact with the temperature control member 30, such that heat generated in the plurality of secondary batteries 10 may be rapidly diffused from the metal layer 21 exhibiting high thermal conductivity to the temperature control member 30. Accordingly, the temperature deviation among the plurality of secondary batteries 10 may be reduced based on a height direction of the housing member, and the efficiency in the temperature control in the battery module may be enhanced.

The temperature control member 30 may include one or more selected from a group consisting of a melanin-based resin, an acrylic resin, an epoxy-based resin, an olefin-based resin, an EVA-based resin, a urethane-based resin, and a silicone-based resin. When the resins are used as the temperature control member 30, the temperature deviation among the plurality of secondary batteries in the battery module may be reduced, thereby enhancing the efficiency in the temperature control.

The metal layer 21 may suppress moisture permeation from an external environment and prevent infiltration and leakage of the electrolyte. The metal layer 21 may be made of metal capable of suppressing moisture permeation. For example, the metal layer 21 may include aluminum or an aluminum alloy, preferably aluminum.

The thickness of the metal layer 21 may be 20 µm to 150 µm, 20 µm to 100 µm, or 30 µm to 60 µm. In the above range, moisture permeation may be effectively suppressed, and the shape of the exterior material may be appropriately maintained.

The thermal conductivity of the metal layer 21 may be greater than or equal to 150 W/(m·K), greater than or equal to 200 W/(m·K), or greater than or equal to 230 W/(m·K). In the conventional battery module, the polyethylene terephthalate-based resin formed on the outermost surface of the exterior material shows a structure that comes in contact with the temperature control member, but the battery module in accordance with the present disclosure shows a structure in which the metal layer 21 formed on an outermost surface of the exterior material 12 comes in contact with the temperature control member 30. In other words, as the battery module in accordance with the present disclosure shows a structure in which the metal layer 21 having a high thermal conductivity of about 1,000 times greater than that of the polyethylene terephthalate-based resin comes in contact with the temperature control member, heat generated in the plurality of secondary batteries 10 may be rapidly diffused to the temperature control member 30.

FIG. 3 illustrates a diagram schematically showing a first area and a second area of the exterior material in accordance with an embodiment of the present disclosure, and FIG. 4 illustrates a diagram showing enlarged boundaries of the first area and the second area of the exterior material in accordance with an embodiment of the present disclosure.

Referring to FIGS. 3 and 4, the exterior material 12 may include the first area 12-1 including the metal layer 21 and the second area 12-2 including an outer surface layer 23 configured to cover the metal layer 21.

In accordance with an embodiment, the first area 12-1 refers to an area in which the metal layer 21 is formed at the outermost surface of the exterior material 12, and the second area 12-2 refers to an area in which the outer surface layer 23 is formed at the outermost surface of the exterior material 12. In other words, while the exterior material 12 includes a laminated structure, all areas thereof do not necessarily have the same laminated structure and may include a laminated structure that is distinguished into the first area 12-1 in which the metal layer 21 is formed at the outermost surface of the exterior material 12 and the second area 12-2 which is configured to cover the metal layer 21 and in which the outer surface layer 23 is formed at the outermost surface of the exterior material 12. For example, the first area 12-1 may be an area in which only the outer surface layer 23 configured to cover the metal layer 21 is removed from the second area 12-2, so that the metal layer 21 is formed at the outermost surface of the exterior material 12.

The first area 12-1 may be an area where a bottom surface 11-1 of the electrode assembly and the exterior material 12 come in contact based on a height direction of the electrode assembly 11. In accordance with an embodiment, the interior of the exterior material 12 is configured to accommodate the electrode assembly 11, and the interior of the exterior material 12 is distinguished into a space where the electrode assembly 11 and the exterior material 12 come in contact and an empty space. Here, the first area 12-1 in which the metal layer 21 is formed at the outermost surface of the exterior material 12 may be an area in which the bottom surface 11-1 of the electrode assembly comes in contact with the exterior material 12 in the space where the electrode assembly 11 and the exterior material 12 come in contact. Therefore, as shown in FIG. 3, since the size of the area where the bottom surface 11-1 of the electrode assembly and the exterior material 12 come in contact may vary depending on the size of the electrode assembly 11, the first area 12-1 may be the same or not.

The outer surface layer 23 may protect the secondary battery 10 from an external physical or chemical environment. The outer surface layer 23 may include a polymer resin that has little or no electrical conductivity, and, for example, the nylon-based resin 23-1 and the polyethylene terephthalate-based resin 23-2 may be laminated in the outer surface layer 23.

The thickness of the outer surface layer 23 may be 10 µm to 100 µm, 10 µm to 50 µm, or 10 µm to 30 µm. In the above range, the secondary battery may be sufficiently protected from the external physical or chemical environment.

The exterior material 12 may include a heat fusion layer 22. In addition, in the first area 12-1, the heat fusion layer 22 and the metal layer 21 may be laminated, and in the second area 12-2, the heat fusion layer 22, the metal layer 21, and the outer surface layer 23 may be laminated.

The heat fusion layer 22 may be used for sealing the exterior material 12. The heat fusion layer 22 may be prevented from being exposed to the outside of the exterior material 12 by the metal layer 21 and have insulation properties to prevent current between the secondary battery 10 and the housing member 20 from leaking.

The heat fusion layer 22 is not particularly limited if it is a polymer resin. For example, the heat fusion layer 22 may include one or more selected from the group consisting of a polyethylene-based resin, a polypropylene-based resin, a polycarbonate-based resin, a polyethylene terephthalate-based resin, a polyvinyl chloride-based resin, an acrylic resin, a polyacrylonitrile-based resin, a polyimide-based resin, a polyamide-based resin, and a cellulose-based resin.

In accordance with an embodiment, in the case of the first area 12-1 in which the bottom surface 11-1 of the electrode assembly and the exterior material 12 come in contact, in order to maintain insulation performance in accordance with removal of the outer surface layer 23 configured to cover the metal layer 21, the thickness H1 of the heat fusion layer of the first area 12-1 may be formed to be greater than the thickness H2 of the heat fusion layer of the second area 12-2. For example, the thickness H1 of the heat fusion layer of the first area 12-1 may be greater than or equal to 1.25 times, 1.50 times, or 2.00 times the thickness H2 of the heat fusion layer of the second area 12-2. More specifically, the thickness H1 of the heat fusion layer of the first area 12-1 may be 100 µm to 500 µm, 100 µm to 400 µm, or 100 µm to 300 µm. In the above range, as the temperature deviation among the plurality of secondary batteries in the battery module is reduced, the efficiency in the temperature control is enhanced, while the insulation performance between the secondary battery and the housing member does not deteriorate.

The device of the present disclosure includes the battery module as a power source. As the battery module in accordance with the present disclosure includes a structure in which the metal layer exhibiting high thermal conductivity comes in contact with the temperature control member, the temperature deviation among the plurality of secondary batteries in the battery module is reduced, thereby enhancing the efficiency in the temperature control. In addition, by including the exterior material in which the thickness of the heat fusion layer is selectively increased only in the area that accommodates the electrode assembly, the insulation performance between the secondary battery and the housing member does not deteriorate. Therefore, the output characteristics, capacity, and stability of the device including the battery module as a power source may be enhanced.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A battery module, comprising:
a secondary battery comprising an electrode assembly and
an exterior material configured to accommodate the electrode assembly;

a housing member configured to accommodate the secondary battery; and
a temperature control member formed inside the housing member and configured to release heat generated in the secondary battery to the outside,
wherein the exterior material comprises: a first area including sequentially a heat fusion layer and a metal layer configured to cover the heat fusion layer, and a second area including sequentially the heat fusion layer, the metal layer, and an outer surface layer configured to cover the metal layer;
wherein the metal layer comes in contact with the temperature control member in the first area.

2. The battery module of claim 1, wherein the temperature control member is formed between a bottom surface of the secondary battery and an inner surface of the housing member based on a height direction of the battery module.

3. The battery module of claim 1, wherein the temperature control member comprises one or more selected from the group consisting of a melanin-based resin, an acrylic resin, an epoxy-based resin, an olefin-based resin, an Ethylene Vinyl Acetate (EVA) based resin, a urethane-based resin, and a silicone-based resin.

4. The battery module of claim 1, wherein the metal layer comprises aluminum.

5. The battery module of claim 1, wherein a thermal conductivity of the metal layer is greater than or equal to 150 W/(m·K).

6. The battery module of claim 1, wherein the first area is an area in which the bottom surface of the electrode assembly and the exterior material come in contact based on a height direction of the electrode assembly.

7. The battery module of claim 1, wherein a nylon-based resin and a polyethylene terephthalate-based resin are laminated in the outer surface layer.

8. The battery module of claim 1, wherein a thickness of the heat fusion layer in the first area is greater than that of the heat fusion layer in the second area.

9. The battery module of claim 1, wherein a thickness of the heat fusion layer in the first area is 1.25 times greater or more than that of the heat fusion layer in the second area.

10. The battery module of claim 1, wherein a thickness of the heat fusion layer in the first area is 100 μm to 500 μm.

11. The battery module of claim 1, wherein the heat fusion layer comprises one or more selected from the group consisting of a polyethylene-based resin, a polypropylene-based resin, a polycarbonate-based resin, a polyethylene terephthalate-based resin, a polyvinyl chloride-based resin, an acrylic resin, a polyacrylonitrile-based resin, a polyimide-based resin, a polyamide-based resin, and a cellulose-based resin.

12. A device comprising the battery module according to claim 1 as a power source.

* * * * *